(12) United States Patent
Song

(10) Patent No.: US 12,172,744 B2
(45) Date of Patent: Dec. 24, 2024

(54) CRASH LOAD DISTRIBUTION STRUCTURE OF FUSELAGE

(71) Applicants: Hyundai Motor Company, Seoul (KR); Kia Corporation, Seoul (KR)

(72) Inventor: Won Ki Song, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/223,916

(22) Filed: Jul. 19, 2023

(65) Prior Publication Data

US 2024/0317383 A1    Sep. 26, 2024

(30) Foreign Application Priority Data

Mar. 20, 2023  (KR) .................. 10-2023-0035571

(51) Int. Cl.
  *B64C 1/06*   (2006.01)
  *B64D 41/00*  (2006.01)
  *H01M 50/579* (2021.01)

(52) U.S. Cl.
  CPC .............. *B64C 1/062* (2013.01); *B64D 41/00* (2013.01); *H01M 50/579* (2021.01); *H01M 2200/00* (2013.01); *H01M 2220/20* (2013.01)

(58) Field of Classification Search
  CPC ..... B64C 1/062; B64D 41/00; B64D 11/0619; H01M 50/579; H01M 2200/00; H01M 2220/20
  See application file for complete search history.

(56) References Cited

U.S. PATENT DOCUMENTS

| | | | | |
|---|---|---|---|---|
| 8,567,849 | B2* | 10/2013 | Rawlinson | B60L 53/80 296/203.02 |
| 2012/0251862 | A1* | 10/2012 | Kano | B60L 50/51 429/99 |
| 2020/0047811 | A1* | 2/2020 | Shimizu | B62D 21/02 |
| 2020/0062311 | A1* | 2/2020 | Kawase | B62D 25/025 |
| 2021/0320366 | A1 | 10/2021 | Hashimoto | |
| 2022/0363122 | A1* | 11/2022 | Mikazuki | B62D 21/157 |
| 2024/0166354 | A1* | 5/2024 | Song | B64C 1/062 |
| 2024/0199189 | A1* | 6/2024 | Song | B64C 1/062 |
| 2024/0253761 | A1* | 8/2024 | Song | B64C 1/062 |

FOREIGN PATENT DOCUMENTS

| | | |
|---|---|---|
| JP | 2018-165138 A | 10/2018 |
| JP | 2019-167060 A | 10/2019 |
| JP | 2022053673 A | 4/2022 |
| KR | 102153029 B1 | 9/2020 |

* cited by examiner

*Primary Examiner* — Rodney A Bonnette

(74) *Attorney, Agent, or Firm* — Banner & Witcoff, Ltd.

(57) ABSTRACT

A crash load distribution structure of a fuselage may include a front fuselage frame surrounding a front surface of the fuselage, a crash unit disposed at the front end of the front fuselage frame, an extension frame coupled to the crash unit and extending to a floor frame, and a battery unit disposed under the floor frame and coupled to a portion of the floor frame constituting the floor frame. The battery unit may be selectively separable from the portion of the floor frame, e.g., if a crash load is transmitted from the extension frame.

10 Claims, 12 Drawing Sheets

CRASH LOAD DISTRIBUTION STRUCTURE OF FUSELAGE

CROSS-REFERENCE TO RELATED APPLICATION

This application claims, under 35 U.S.C. § 119(a), the benefit of and priority to Korean Patent Application No. 10-2023-0035571, filed on Mar. 20, 2023, the entire contents of which are incorporated herein by reference.

TECHNICAL FIELD

The present disclosure relates to a crash load distribution structure of a fuselage. More particularly, it relates to a crash load distribution structure of a fuselage in which a battery may be separated in case of oblique fall of the fuselage, thereby ensuring safety against fire.

BACKGROUND

Air mobility vehicles, such as urban air mobility (UAM) vehicles, may be used in an air traffic system to solve or alleviate road traffic congestion.

A UAM vehicle may be configured to of safely transporting passengers and/or cargo to a designated place. UAM vehicles may be used at a lower cost and risk because they may be capable of autonomous driving, whereby a pilot is not needed. UAM vehicles may be capable of vertical take-off and landing (e.g., as a helicopter), whereby a separate runway is not needed, which may reduce cost and resources.

Because passengers and/or cargo may be located inside (e.g., close to an inner side) of a fuselage of the UAM vehicle, technology to secure stability of the passenger and the fuselage in the event of a crash is of the highest importance.

However, UAM vehicles may have a problem that safety is not guaranteed because a large crash load may be transmitted to a space where passengers and/or cargo are located, e.g., due to an impact applied to the fuselage during a crash.

The above information disclosed in this Background section is only for enhancement of understanding of the background of the disclosure, and therefore it may contain information that does not form the prior art that is already known in this country to a person of ordinary skill in the art.

SUMMARY OF THE DISCLOSURE

The following summary presents a simplified summary of certain features. The summary is not an extensive overview and is not intended to identify key or critical elements.

Systems, apparatuses, and methods are described for a crash load distribution structure of a fuselage. A crash load distribution structure of a fuselage may comprise a front fuselage frame surrounding a front surface of a fuselage, a crash unit disposed at a front end of the front fuselage frame, an extension frame coupled to the crash unit and extending to a floor frame, and a battery unit disposed under the floor frame and coupled to a portion of the floor frame. The battery unit may be configured to be selectively separated from the portion of the floor frame based on a load transmitted via the extension frame to the crash unit.

Also, or alternatively, a crash load distribution structure of a fuselage may comprise a front fuselage frame surrounding a front surface of a fuselage, a crash unit disposed at a front end of the front fuselage frame, an extension frame coupled to the crash unit and extending to a floor frame and a battery unit disposed under the floor frame and coupled to a portion of the floor frame, The extension frame may include a deformation section configured to absorb a load, and a support section bent from the deformation section in a width direction and configured to receive the load. The battery unit may be configured to be selectively separated from the portion of the floor frame based on the load being transmitted via the extension frame.

These and other features and advantages are described in greater detail below.

BRIEF DESCRIPTION OF THE DRAWINGS

The above and other features of the present disclosure will now be described in detail with reference to certain examples thereof illustrated in the accompanying drawings which are given hereinbelow by way of illustration only, and thus are not limitative of the present disclosure, and wherein.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes, will be determined in part by the particular intended application and usage environment.

Throughout the figures, reference numbers refer to the same or equivalent parts of the present disclosure.

DETAILED DESCRIPTION

Advantages and/or features of the present disclosure will be apparent in the following detailed description of the examples with reference to the accompanying drawings. However, the present disclosure may be embodied in many different forms, and should not be construed as being limited to the examples set forth herein. Rather, the examples are provided so that the description of the present disclosure will be thorough and complete, and will fully convey the scope of the present disclosure to those skilled in the art.

If a detailed explanation of a known function or structure would unnecessarily obscure the gist of the present disclosure, such explanation will be omitted, but would be understood by those skilled in the art.

Figure 1:
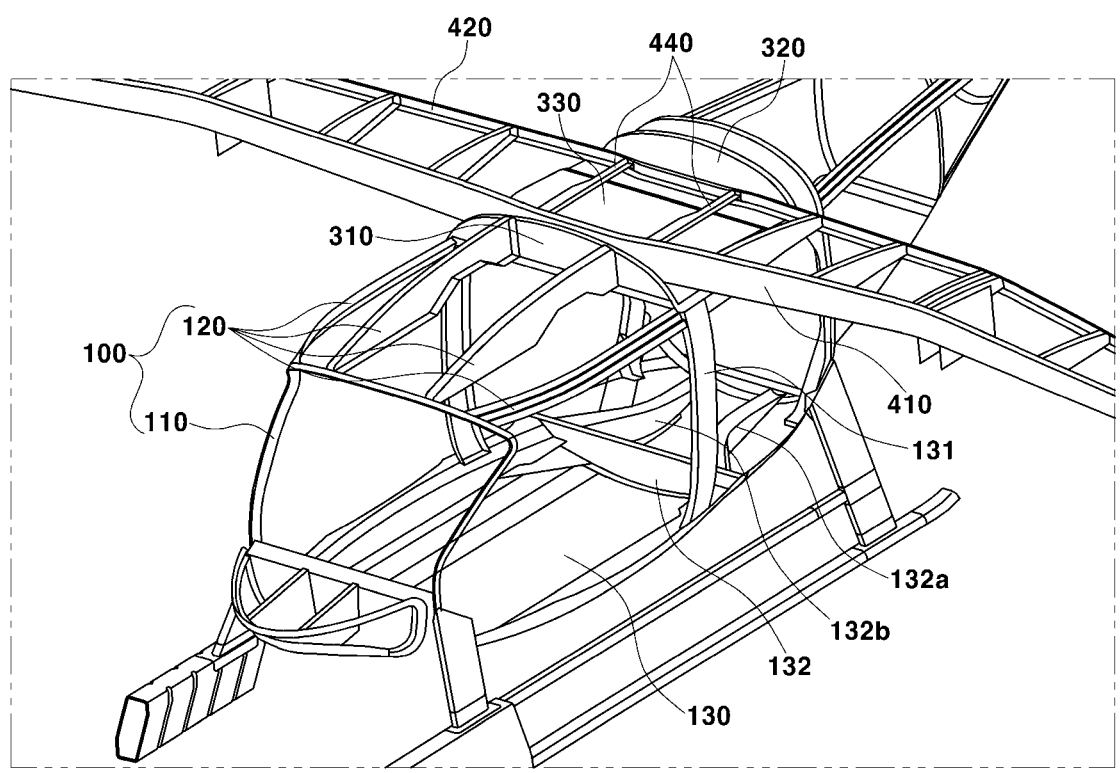
FIG. 1 is a view illustrating a crash load distribution structure of a fuselage according to an example of the present disclosure.
Figure 2:
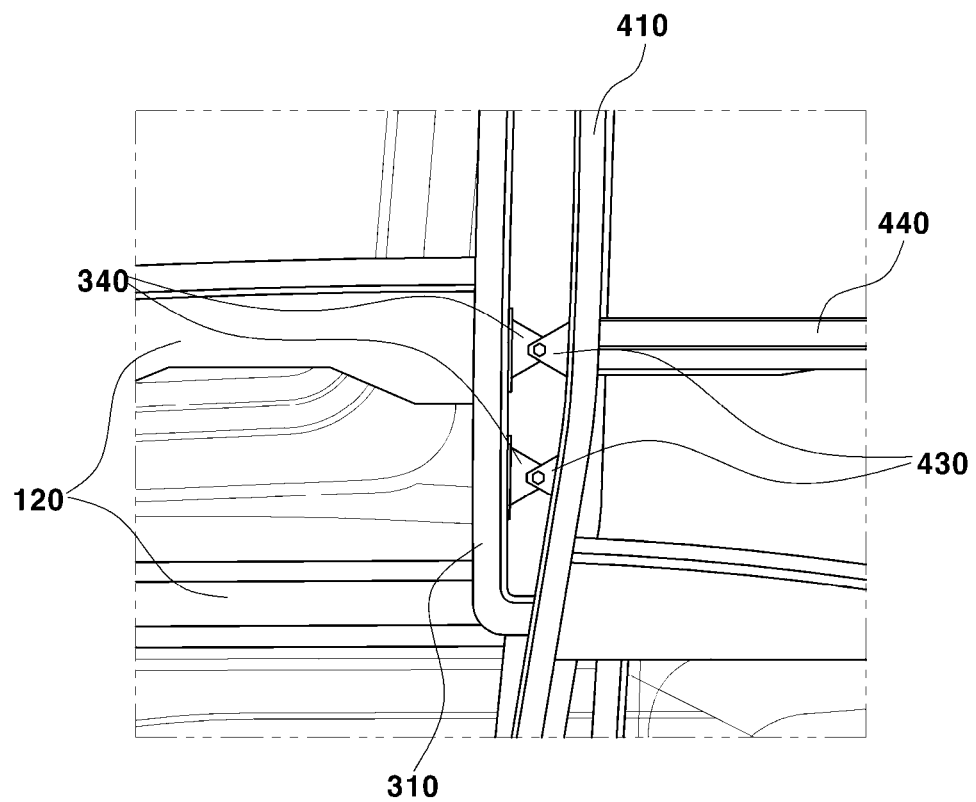
FIG. 2 is a view illustrating a fastening relationship between a support fitting member and a wing fitting member in a crash load distribution structure of a fuselage according to an example of the present disclosure.

FIG. 1 is a perspective view of a crash load distribution structure of a fuselage of the present disclosure. FIG. 2 is a side perspective view of a crash load distribution structure of a fuselage of the present disclosure, illustrating a fastening relationship between a support fitting member and a wing fitting member.

An air mobility vehicle according to this example may include an aircraft capable of vertical take-off and landing as well as mid-range flight. The air mobility vehicle may be defined as an advanced air mobility (AAM) vehicle, which may include manned and/or unmanned aircraft and/or autonomous flying and/or human-driven aircraft. For any such air mobility vehicle, because the fuselage has a structure configured to accommodate passengers and/or cargo, an impact load (alternately referred to herein as a crash load) may be generated in in a fall or crash, or a take-off or landing (e.g., a vertical take-off and/or landing, e.g., using a runway). It is important to absorb impact energy at a front and/or rear of the fuselage, thereby reducing deformation of a central area, i.e., an area configured to accommodate for any passengers and/or cargo (e.g., a boarding area, seating area, storage area, etc.).

Referring to FIGS. 1 and 2, the crash load distribution structure of the fuselage according to an example of the present disclosure may include a support unit 300, positioned between a front unit 100 and a rear unit 200 and being connected to a wing unit 400 (comprising wings of the air mobility vehicle), so as to allow a load applied to the fuselage to be distributed to the wing unit 400 and to the rear of the fuselage. More specifically, according to an example of the present disclosure, a longitudinal load and a vertical load applied to the fuselage may be transmitted via a connection between the front unit 100 and the support unit 300, a connection between the support unit 300 and the rear unit 200, and a connection between the support unit 300 and the wing unit 400, thereby reducing a crash load entering a space where passengers are located.

The front unit 100 may be located towards a front of the fuselage with respect to the wing unit 400. The front unit 100 may include a window frame 110, to which a windshield may be mounted, and a roof frame 120. The roof frame 120 may be connected to a rear end of the window frame 110 and may extend in a longitudinal direction of the fuselage. The window frame 110 may be a frame surrounding the front windshield of the fuselage. The roof frame 120 may be fastened to the upper end of the window frame 110 and may be provided in a plurality of roof frames 120 spaced apart in a width direction of the window frame 110. In an example, as illustrated in FIG. 1, a total of four roof frames 120, e.g., two at the center and two at the sides, may be spaced apart at regular intervals in the width direction of the window frame 110. A floor frame 130 may define a fuselage floor. The floor frame 130 may divide an indoor space inside the front unit 100 into a first-row passenger space in the front and a second-row passenger space in the rear. In an example, the floor frame 130 divide the indoor space into the first-row passenger space and the second-row passenger space using a rear bulkhead 132 as a boundary. The rear bulkhead 132 may be provided with a pair of connection frames 132a and 132b configured to be connected to a second rear frame 220 to be described below.

The support unit 300 may be disposed between the front unit 100 and the rear unit 200. The roof frame 120 may be connected to the support unit 300. More specifically, the roof frame 120 may have a rear end connected to the front end of the support unit 300. The support unit 300 may be connected to the front unit 100 and to the rear unit 200 so that a load applied to the front of the fuselage is distributed to the rear of the fuselage. More specifically, the support unit 300 may include a first flange portion 310, a second flange portion 320, a plate portion 330, and a support fitting member 340.

The support unit 300 may have a structure in which the first flange portion 310 and the second flange portion 320 comprise flanges that face each other, with the plate portion 330 provided therebetween. The support unit 300 may have inner sides that form an inner space where the first flange portion 310 and the second flange portion 320 face each other and are fastened to the plate portion 330, and a corresponding outer surface away from the formed space. The first flange portion 310 may be connected to the rear end of the roof frame 120. More specifically, the rear end of the roof frame 120 may be fastened to a front outer surface of the first flange portion 310. The second flange portion 320 may be connected to the front end of the rear unit 200. More specifically, the front end of the rear unit 200 may be fastened to the rear outer surface of the second flange portion 320.

The plate portion 330 may be provided between the first flange portion 310 and the second flange portion 320. More specifically, the plate portion 330 may define a back surface of a recessed area between the first flange portion 310 and the second flange portion 320 located at opposite sides in the longitudinal direction of the fuselage. The plate portion 330 may have a plate shape and may be provided between the lower end portions of the first flange portion 310 and the second flange portion 320. The plate portion 330 may be connected to a member that defines the outer frame of the fuselage so that longitudinal and vertical loads in the fuselage are dispersed.

The support fitting member 340 may be provided on opposite sides on each of the inner surfaces of the first flange portion 310 and the second flange portion 320. In an example, the support fitting member 340 is provided on the inner surface of the first flange portion 310 and is fastened to a wing fitting member 430 provided at a position corresponding to a longitudinal one end of a wing frame portion 440. More specifically, when a connection structure between the first flange portion 310 and a first skeleton portion 410 needs to be reinforced, the inner surface of the first flange portion 310 may be provided thereon with two support fitting members 340 at a left side and two support fitting members 340 at a right side in the width direction, as illustrated in FIG. 2. In addition, the inner surface of the second flange portion 320 may be provided thereon with two support fitting members 340 at a left side and two support fitting members 340 at a right side in the width direction. The support fitting members 340 each may have one end provided at a position corresponding to the inner surface of the first flange portion 310 or to the inner surface of the second flange portion 320, and may have another end having a coupling portion configured to be fastened to a wing fitting member 430.

The wing unit 400 may be located inside (e.g., in or corresponding to the inner space of) the support unit 300. The wing unit 400 may be connected to the support unit 300 in a way such that a crash load (e.g., upon collision, crash, landing, etc.) of the fuselage would be distributed along the wing unit 400. The wing unit 400 may include the first skeleton portion 410, a second skeleton portion 420, the wing fitting member 430, the wing frame portion 440, and a skin portion 450. The first skeleton portion 410 may be spaced apart by a predetermined gap from the inner surface of the first flange portion 310 and extend in the width direction of the fuselage. The second skeleton portion 420 may be spaced apart by a predetermined gap from the inner surface of the second flange portion 320 and may extend in the width direction of the fuselage. The first skeleton portion 410 may define a transverse skeleton of the front end of the wing unit 400, and the second skeleton portion 420 may define a transverse skeleton of the rear end of the wing unit 400.

The wing fitting member 430 may be provided on an outer surface of the first skeleton portion 410 or on an outer surface of the second skeleton portion 420, at a position corresponding to a longitudinal direction of the support fitting member 340. More specifically, a portion of the outer surface of the first skeleton portion 410 at which the wing fitting member 430 is located (e.g., see FIG. 2) may be oriented such that the first skeleton portion 410 faces the first flange portion 310, and a portion of the outer surface of the second skeleton portion 420 at which the wing fitting member 430 is located may be oriented such that the second skeleton portion 420 faces the second flange portion 320.

The wing fitting member 430 may be connected to the support fitting member 340. In an example, the outer surface of the first skeleton portion 410 may be provided thereon with two wing fitting members 430 at a left side and two wing fitting members 430 at a right side in the width direction. In addition, the outer surface of the second skeleton portion 420 may be provided thereon with two wing fitting members 430 at a left side and two wing fitting members 430 at a right side in the width direction. The wing fitting member 430 may have one end fixed to the outer surface of the first skeleton portion 410 or to the outer surface of the second skeleton portion 420, and may have another end having formed therein a coupling portion. The coupling portion of the support fitting member 340 and the coupling portion of the wing fitting member 430 may be mutually fastened, and the wing unit 400 may be fixed to the support unit 300.

The wing frame portion 440 may be provided between the first skeleton portion 410 and the second skeleton portion 420. The wing fitting member 430 may be provided at a position corresponding to a first longitudinal end of the wing frame portion 440 (e.g., a crossbeam and/or other transverse support). More specifically, as illustrated in FIG. 1, two wing frame portions 440 may be provided between the first frame portion 410 and the second frame portion 420 positioned above the plate portion 330. In addition, the wing frame portions 440 are positioned between the first skeleton portion 410 and the second skeleton portion 420 so as to allow loads applied to the first skeleton portion 410 and the second skeleton portion 420 to be transmitted to each other. More specifically, the wing fitting member 430 is fastened to the support fitting member 340 in a state in which the wing frame portion 440 is positioned on the same line as the roof frame 120 facing the wing frame portion 440, as illustrated in FIG. 2. Thus, a load applied to the first skeleton portion 410 and/or a load applied to the second skeleton portion 420 may be distributed via the connection created by the wing fitting member 430 fastened to the support fitting member 340.

A skin portion 450 (e.g., a material forming a skin) may surround the outer sides of the first skeleton portion 410 and the second skeleton portion 420. More specifically, the skin portion 450 may contact the upper surfaces of the first skeleton portion 410 and the second skeleton portion 420. Accordingly, the skin portion 450 in contact with the first skeleton portion 410 and the second skeleton portion 420 may allow the load transmitted to the first skeleton portion 410 and to the second skeleton portion 420 to be distributed in the longitudinal direction and/or in the width direction of the wing unit 400. A longitudinal load on the fuselage may pass through the front unit 100 and the support unit 300 and then be distributed to the wing unit 400.

Figure 3:
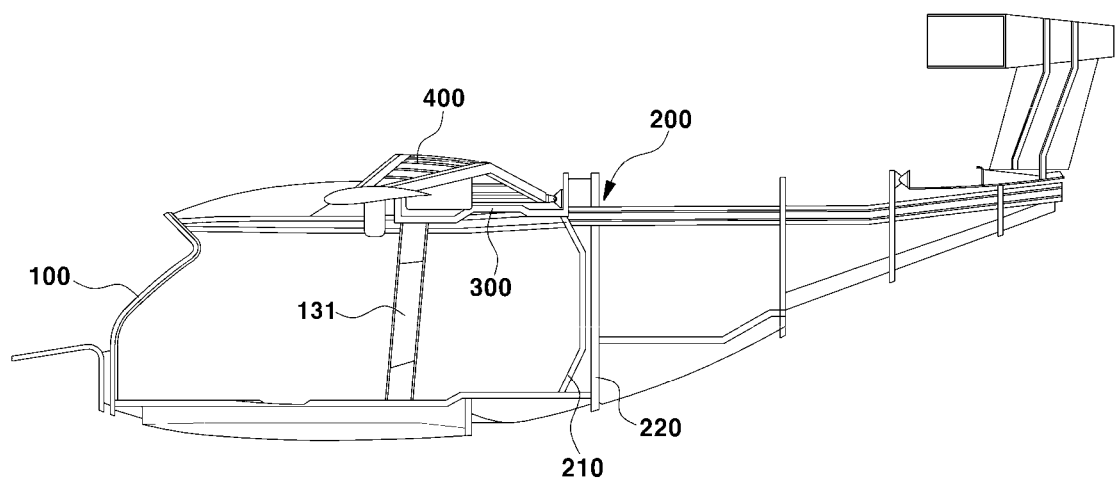
FIG. 3 is a view illustrating a rear unit in a crash load distribution structure of a fuselage according to an example of the present disclosure.
Figure 4:
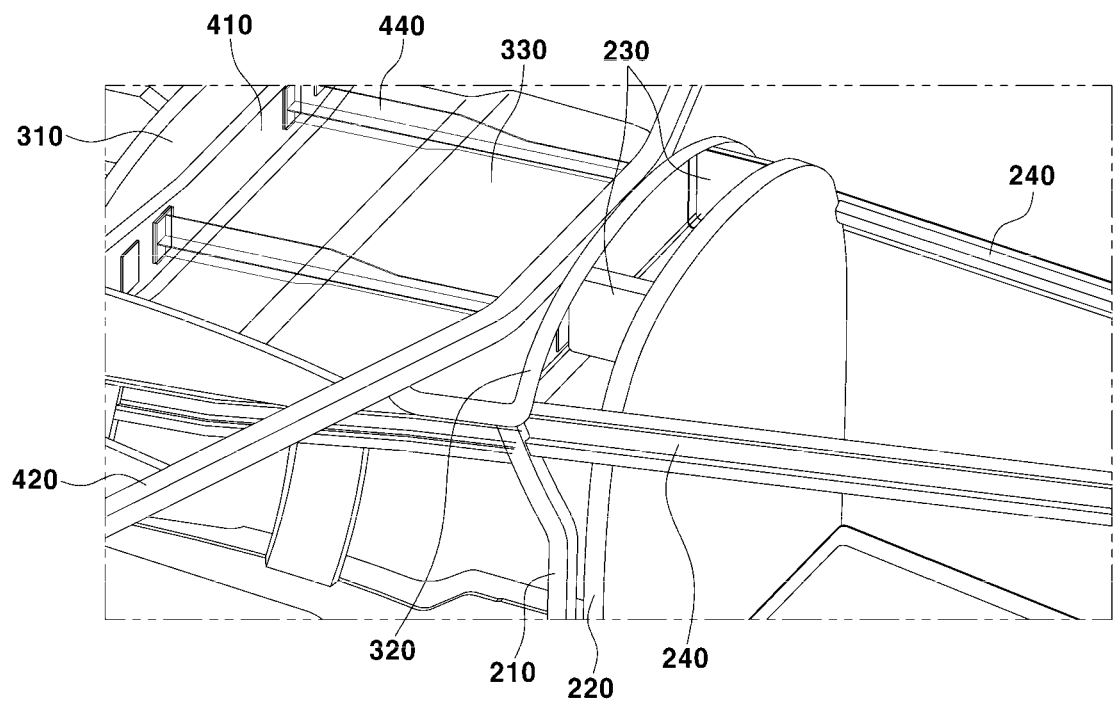
FIG. 4 is a view illustrating a connection relationship between a wing unit and a rear unit in a crash load distribution structure of a fuselage according to an example of the present disclosure.

FIG. 3 illustrates a rear unit in a crash load distribution structure of a fuselage as an example of the present disclosure, and FIG. 4 illustrates the connection relationship between the wing unit 400 and the rear unit in a crash load distribution structure of a fuselage as an example of the present disclosure.

Referring to FIGS. 3 and 4, the rear unit 200 may be located at the rear of the fuselage with respect to the wing unit 400. The rear unit 200 may include the first rear frame 210, the second rear frame 220, a rear center frame 230, and a rear side frame 240. The first rear frame 210 may be connected to the plate portion 330. More specifically, the first rear frame 210 may extend in a height direction from the fuselage floor along the outer side of the fuselage and may be fastened to a lower end of the second flange portion 320. In an example, the first rear frame 210 may have an upper end in contact with the lower end of the second flange portion 320.

The second rear frame 220 may be located at the rear end of the first rear frame 210. More specifically, the second rear frame 220 may have a plate shape and be located adjacent to the rear end of the first rear frame 210. The second rear frame 220 may be fastened to the pair of connection frames 132a and 132b connected to the rear bulkhead 132 and may be positioned to have a predetermined gap, more specifically, a gap corresponding to the length of the rear center frame 230 of FIG. 4, from the upper end of the first rear frame 210, and as such, a load coming from the lower end of the fuselage may be transmitted to the upper end of the fuselage in the height direction.

The rear center frame 230 may be disposed between the second flange portion 320 and the second rear frame 220. More specifically, the rear center frame 230 may be disposed in a space between the second flange portion 320 and the second rear frame 220 where the same face each other. In an example, the rear center frame 230 may be provided as two and may be provided at positions each longitudinally corresponding to the position of the wing frame portion 440.

The rear side frame 240 may be in contact with the first rear frame 210 and the second rear frame 220. More specifically, the rear side frame 240 may be connected to an upper end of the first rear frame 210 and an upper end of the second rear frame 220. The rear side frame 240 may extend rearwards in the longitudinal direction of the fuselage. More specifically, the rear side frame 240 may have one end connected to the first rear frame 210 and may have another end extending to the rear of the fuselage.

Figure 5:
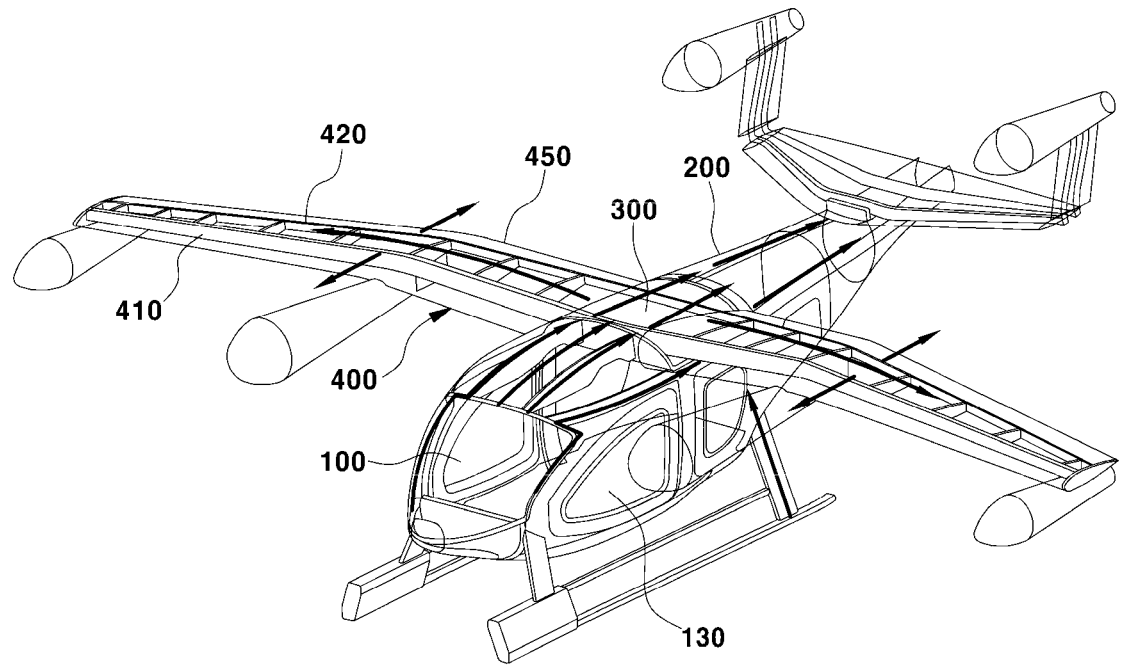
FIG. 5 is a view illustrating that longitudinal and vertical loads are distributed to a wing unit and to a rear of a fuselage in a crash load distribution structure of the fuselage according to an example of the present disclosure.

FIG. 5 illustrates how longitudinal and/or vertical loads may be distributed to the wing unit 400 and/or to the rear of the fuselage via the crash load distribution structure of the fuselage as an example of the present disclosure.

Referring to FIG. 5, a longitudinal load on the fuselage may be transmitted to the first flange portion 310 via the window frame 110 and the roof frame 120, and then be transmitted to the first skeleton portion 410 via the support fitting member 340 and the wing fitting member 430 and distributed throughout the skin portion 450. In addition, the load transmitted to the first skeleton portion 410 may be transmitted to the second skeleton portion 420 via the wing frame portion 440 and distributed through the skin portion 450.

In an example, when the fuselage falls and a crash load having a predetermined angle with the front end of the fuselage is applied, a longitudinal load may enter the window frame 110 and be transmitted to the front end of the roof frame 120 connected to the rear end of the window frame 110. Thereafter, the load transmitted to the rear end of the roof frame 120 may be transmitted to the first flange portion 310, and then be transmitted to the support fitting member 340 and to the wing fitting member 430. The load transmitted to the support fitting member 340 and to the wing fitting member 430 may be transmitted to the first skeleton portion 410 and be distributed in the longitudinal direction of the first skeleton portion 410. The load distributed in the longitudinal direction of the first skeleton portion 410 may also be distributed in the longitudinal direction of the fuselage through the skin portion 450. In addition, or alternatively, the load transmitted to, or applied to, the first skeleton portion 410 may be transmitted to the second skeleton portion 420 via the wing frame portion 440 and distributed in the longitudinal direction of the second skeleton portion 420. The load distributed in the longitudinal direction of the second skeleton portion 420 may also be distributed in the longitudinal direction of the fuselage through the skin portion 450.

If the fuselage falls and/or collides with an object, and a crash load is applied, e.g., to the front end of the fuselage at a particular angle, a load in the height direction of the fuselage transmitted to the floor frame 130 may be transmitted to the roof frame 120 and to the second flange portion 320 via the center frame 131 and the first rear frame 210, respectively, and be transmitted to the rear side frame 240 and the rear center frame 230 of the rear unit 400 via the second rear frame 220, and then be transmitted to the second skeleton portion 420 via the support fitting member 340 and the wing fitting member 430, then be distributed through the skin portion 450. In addition, the load transmitted to the second skeleton portion 420 may be transmitted to the first skeleton portion 410 via the wing frame portion 440 and distributed over the entire area of the fuselage.

Figure 7:
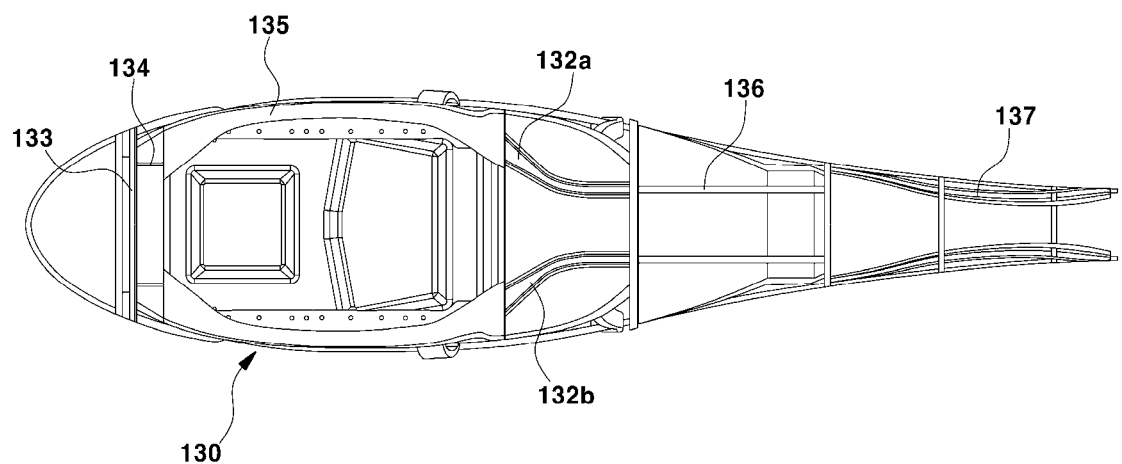
FIG. 7 is a view illustrating transmission of a load on a floor frame in a crash load distribution structure of a fuselage according to an example of the present disclosure.

In an example, when a crash load in the height direction of the fuselage is applied, the load in the height direction transmitted to the fuselage may be transmitted to the floor frame 130 at the lower ends of the center frame 131 and the first rear frame 210, that is, the load may be transmitted (e.g., sequentially) along a front reinforcement 133, a first skeleton member 134, a second skeleton member 135, the connection frames 132a and 132b, a third skeleton member 136, and a fourth skeleton member 137 constituting the floor frame 130 as illustrated in FIG. 7, and may be transmitted to the roof frame 120 and the second flange portion 320 connected to the upper ends of the center frame 131 and the first rear frame 210. In addition, a part of the vertical load applied to the fuselage may enter the lower end portion of the second rear frame 220 and be transmitted to the rear side frame 240 connected to the upper end of the second rear frame 220. The crash load applied to the second rear frame 220 may be transmitted to the second flange portion 320, and be transmitted to the wing fitting member 430 via the support fitting member 340 fastened to the second flange portion 320. The load transmitted to the support fitting member 340 and to the wing fitting member 430 may be transmitted to the second skeleton portion 420 and be distributed in the longitudinal direction of the second skeleton portion 420. The load distributed in the longitudinal direction of the second skeleton portion 420 may also be distributed in the longitudinal direction of the fuselage through the skin portion 450. In addition, the load transmitted to the second skeleton portion 420 may be transmitted to the first skeleton portion 410 via the wing frame portion 440 and distributed in the longitudinal direction of the first skeleton portion 410. The load distributed in the longitudinal direction of the first skeleton portion 410 may also be distributed in the longitudinal direction of the fuselage through the skin portion 450. Accordingly, the vertical load on the fuselage may pass through the rear unit 200 and then be distributed to the wing unit 400 through the support unit 300.

Figure 6:
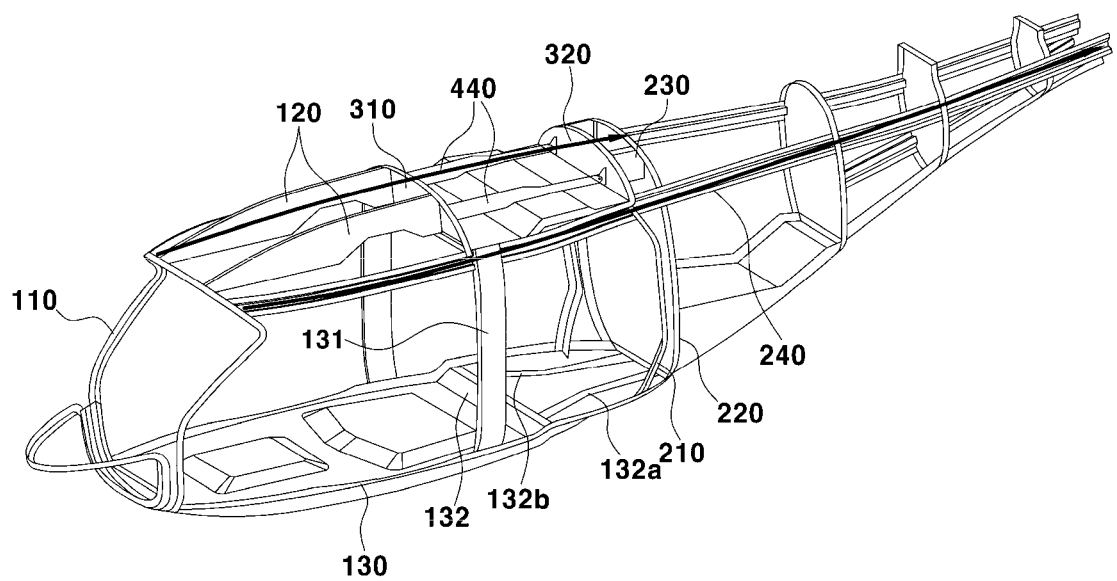
FIG. 6 is a view illustrating transmission of a longitudinal load on a center and sides in a crash load distribution structure of a fuselage according to an example of the present disclosure.

FIG. 6 illustrates transmission of a longitudinal load on a center and sides in a crash load distribution structure of a fuselage according to an example of the present disclosure. In the following description, any description indicating sequential load transmission is provided only for explaining structural interconnection throughout the crash load distribution structure and is nonlimiting.

Referring to FIG. 6, a load applied in the longitudinal direction of the fuselage may be transmitted from the roof frame 120 to the wing frame portion 440 via the first flange portion 310 and transmitted from the wing frame portion 440 to the rear center frame 230 via the second flange portion 320. In addition, side loads in the longitudinal direction of the fuselage each may be transmitted from the front roof frame 120 at a corresponding one of opposite side ends of the fuselage to the rear side frame 240 via the first rear frame 210 along the side surface of the plate portion 330.

More specifically, a load applied in the longitudinal direction of the fuselage may be transmitted from the front end of the roof frame 120 to the rear end of the same, and then be transmitted to the support fitting member 340 and the wing fitting member 430 adjacent to the first flange portion 310 via the first flange portion 310. Thereafter, the load transmitted to the support fitting member 340 and the wing fitting member 430 adjacent to the first flange portion 310 may be transmitted to the wing frame portion 440, and then may be transmitted to the support fitting member 340 and the wing fitting member 430 adjacent to the second flange portion 320. The load transmitted to the support fitting member 340 and the wing fitting member 430 adjacent to the second flange portion 320 may be transmitted to the second flange portion 320, and then be transmitted to the rear center frame 230.

In addition, among the loads in the longitudinal direction of the fuselage, loads transmitted along the side surfaces may be transmitted from the front end to the rear end of the fuselage along the roof frames 120 at opposite side ends, respectively, and may be transmitted to the rear of the fuselage in the longitudinal direction of the plate portion 330. The load transmitted to the rear end of the plate portion 330 may be transmitted to the rear side frame 240 via the first rear frame 210.

In summary, the present disclosure provides a crash load distribution structure of a fuselage to which the support unit 300 is applied so as to allow a crash load entering the fuselage to be transmitted and distributed to the wing unit 400 and to the rear of the fuselage and the crash load entering a space where passengers are located to be reduced to thereby secure stability.

Figure 8:
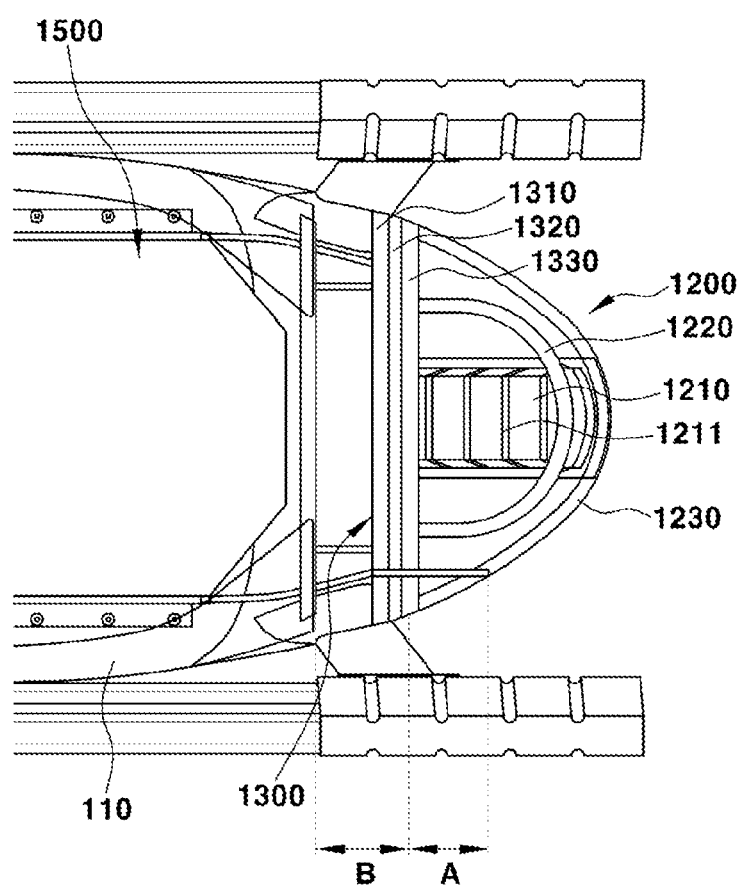
FIG. 8 is a view illustrating transmission of a crash load in a crash load distribution structure of a fuselage according to an example of the present disclosure.
Figure 9:
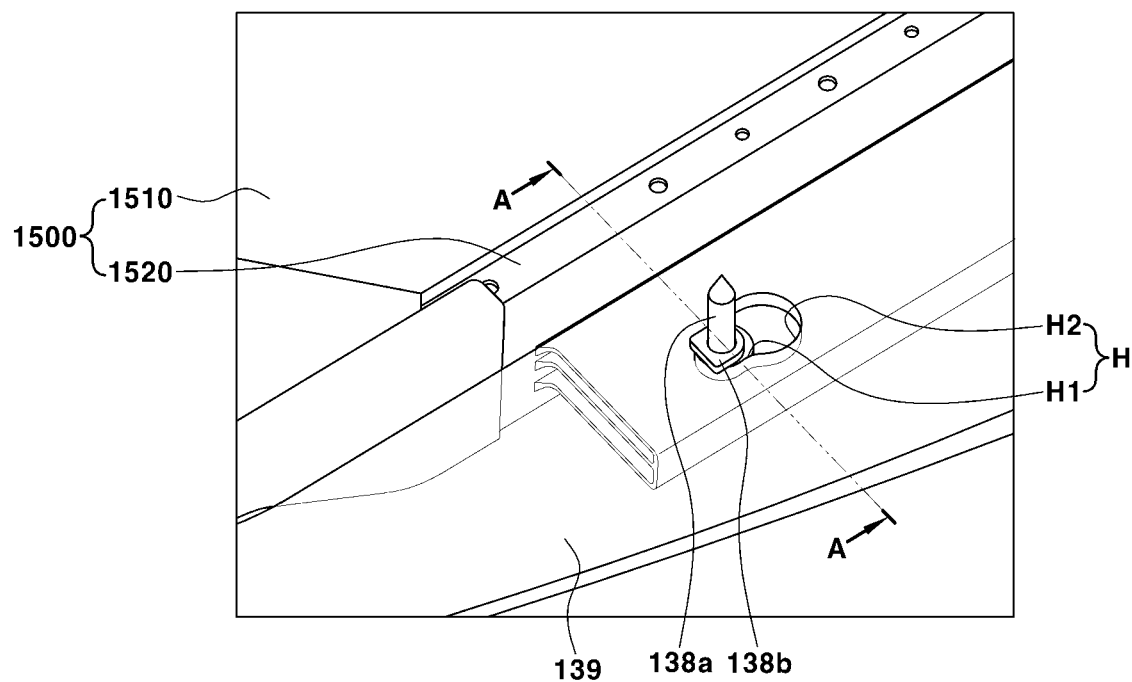
FIG. 9 is a view illustrating a through hole in a floor member in a crash load distribution structure of a fuselage according to an example of the present disclosure.
Figure 10:
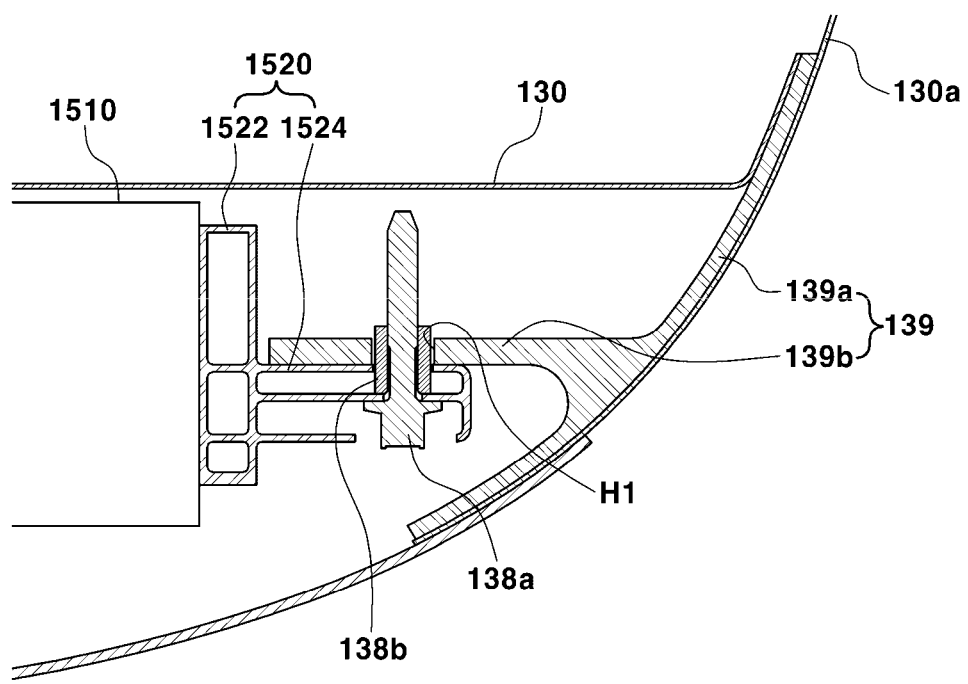
FIG. 10 is a cross-sectional view A-A of FIG. 9 illustrating a coupled state between a floor member and a battery unit in a crash load distribution structure of a fuselage according to an example of the present disclosure.

FIG. 8 is a view illustrating transmission of a crash load in a crash load distribution structure of a fuselage according to an example of the present disclosure, FIG. 9 is a view illustrating a through hole in a floor member in a crash load distribution structure of a fuselage according to an example of the present disclosure, and FIG. 10 is a cross-sectional view A-A of FIG. 9 illustrating a coupled state between a floor member and a battery unit in a crash load distribution structure of a fuselage according to an example of the present disclosure.

Figure 11:
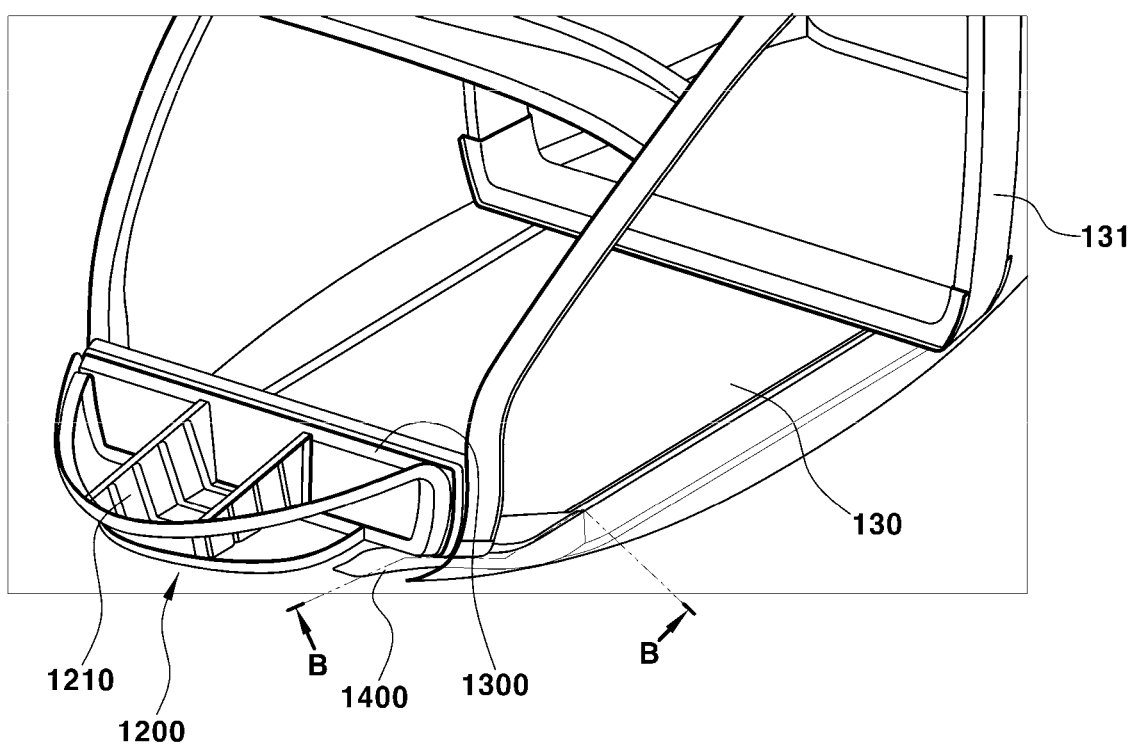
FIG. 11 is a view illustrating a crash load transmission path in an extension frame in a crash load distribution structure of a fuselage according to an example of the present disclosure.
Figure 12:
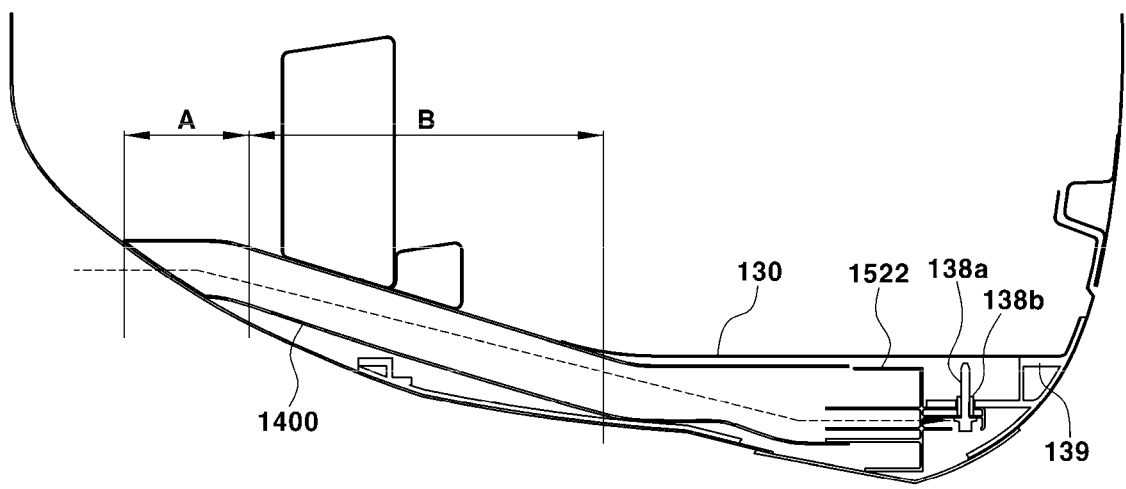
FIG. 12 is a cross-sectional view B-B of FIG. 11 illustrating a crash load transmission path in an extension frame in a crash load distribution structure of a fuselage according to an example of the present disclosure.

FIG. 11 is a view illustrating a crash load transmission path in an extension frame in a crash load distribution structure of a fuselage according to an example of the present disclosure, and FIG. 12 is a cross-sectional view B-B of FIG. 11 illustrating a crash load transmission path in an extension frame in a crash load distribution structure of a fuselage according to an example of the present disclosure. In the following description, any description indicating sequential load transmission is provided only for explaining structural interconnection throughout the crash load distribution structure and is nonlimiting.

The crash load distribution structure of a fuselage according to this example includes a crash unit 1200 disposed at the front end of the front fuselage frame, an extension frame 1400, and a battery unit 1500.

As illustrated in FIG. 8, the crash unit 1200 has a streamlined cross-sectional shape protruding from the front of the fuselage 10.

Here, the crash unit 1200 includes a crash box 1210, an upper frame 1220, a dash reinforcement assembly 1300, and a lower frame 1230. The crash box may be positioned in a front end in a longitudinal direction of the crash unit 1200. The upper frame 1220 may be positioned to extend at least in part between the front end of the crash box 1210 and the dash reinforcement assembly 1300 in the longitudinal direction. The lower frame 1230 may be fastened to the upper frame 1220 and positioned at the front lower end of the crash box 1210.

The lower frame 1230 may have one end surrounding the front lower end of the crash box 1210 and have another end fastened to the upper frame 1220 and/or to the front surface of the dash reinforcement assembly 1300. Thus, an impact applied to the lower frame 1230 may be transmitted along the upper frame 1220 and be transmitted to a dash reinforcement assembly 1300 fastened to the upper frame 1220.

Here, the crash box 1210 may form an area recessed in the longitudinal direction and may include at least one curved portion 1211. The curved portion 1211 may be curved in the height direction of the fuselage 10, and may have a shape such that the lower surface thereof is concave corresponding to the curve. Moreover, the curved portion 1211 may have a shape configured to cause stress to concentrate in the curved portion 1211 when an impact is applied to the front of the fuselage 10. Accordingly, when an impact is applied to the front end of the crash box 1210, the crash box 1210 is folded with respect to the curved portion 1211 so as to absorb a part of the impact applied at the front end. More specifically, the curved portion 1211 according to the present disclosure may be formed along the front surface of the crash box 1210 having a U-shaped cross section.

Accordingly, when a frontal impact is applied, at least one curved portion 1211 formed in the crash box 1210 may be folded so as to absorb a part of the applied impact. Here, the rest of the impact, not absorbed by the crash box 1210, may be transmitted to the dash reinforcement assembly 1300 via the upper frame 1220, the lower frame 1230, and a support surface 1212. With this configuration, the crash box 1210 of the crash unit 1200 may perform a function of absorbing a part of the impact applied to the front end, and at the same time, may transmit the rest of the impact to the entire fuselage 1.

Meanwhile, as illustrated in FIG. 8, the crash load distribution structure of the fuselage according to this example includes the window frame 110 and provides the dash reinforcement assembly 1300 configured to cover at least a portion of the lower portion of the window frame 110.

The dash reinforcement assembly 1300 may be disposed to separate the crash unit 1200 from the interior space. With such a structure, the dash reinforcement assembly 1300 may prevent transmission of impact between the crash unit 1200 and the dash reinforcement assembly 1300 and prevent the crash box 1210 from being pushed into the interior space.

The dash reinforcement assembly 1300 may be configured to partition the interior of the vehicle from the crash unit 1200 located in the front, and may be positioned by being engaged with the front frame where the windshield is disposed. More specifically, the dash reinforcement assembly 1300 includes a shock absorbing portion 1330 located in the front. Because the shock absorbing portion 1330 may have a porous honeycomb structure, the same may function to absorb a transmitted crash load. In addition, the dash reinforcement assembly 1300 includes an inner reinforcement 1310 facing the interior space of the fuselage 10 where passengers are located, and an outer reinforcement 1320 disposed between the inner reinforcement 1310 and the shock absorbing portion 1330.

In addition, the extension frame 1400 according to this example may be coupled to the crash unit 1200 and extends to the floor frame.

As illustrated in FIGS. 11 and 12, the extension frame 1400 extends downwards towards the floor frame 130, and includes a deformation section A where a crash load is absorbed and a support section B bent from the deformation section A in the width direction and configured to support the crash load (see FIG. 8).

Accordingly, if a crash load is transmitted to the crash unit 1200, a part of the impact applied to the front end is primarily absorbed in the crash box 1210, and the extension frame 1400 deforms in the deformation section A to absorb the crash load but does not deform in the support section B due to the shape bent from the deformation section A in the width direction, thereby structurally supporting the crash load (see FIG. 8).

Here, the extension frame 1400 may extend obliquely downwards towards the floor frame 130 and is connected to the battery unit 1500 as illustrated in FIG. 9.

The battery unit 1500 may be, as illustrated in FIG. 10, disposed under the floor frame 130 and coupled to the floor member 139, which is a portion of the floor frame constituting the floor frame 130, and may be selectively separated from the floor member 139 if a crash load is transmitted from the extension frame 1400.

To this end, the battery unit 1500 includes a battery 1510 and battery supports 1520.

The battery 1510 is configured to supply power to drive the fuselage 10, and each of the battery supports 1520 is coupled to a corresponding one of opposite sides of the battery 1510 and is connected to the end portion of the extension frame 1400 extending to the floor frame 130.

The battery support 1520 is disposed under the floor frame 130 and is movable rearwards by a crash load transmitted from the extension frame 1400, and thus may be selectively separated from the floor member 139.

The battery support 1520 includes a first mounting member 1522 and a second mounting member 1524 (see FIG. 10).

The first mounting member 1522 has a shape corresponding to the shape of the extended end portion of the extension frame 1400 and is coupled thereto by being brought into contact with the battery 1510.

The second mounting member 1524 extends horizontally from the first mounting member 1522 and is coupled to the floor member 139 using a fastening member 138a and a nut 138b penetrating the floor member 139 together.

In other words, the second mounting member 1524 has formed therethrough the fastening member 138a for fixation of the battery 1510, and the fastening member 138a may be fixed in place by being fastened to the nut 138b provided in the second mounting member 1524. The battery unit 1500 may be fixed in place under the floor frame 130 by the nut 138b being engaged in a through hole H, which will be described later (see FIG. 9).

Here, for a structure in which the battery unit 1500 is fixed under the floor frame 130, the floor frame 130 is provided with a pair of floor members 139 facing the second mounting member 1524, and the floor member 139 includes a first connection member 139a (e.g., a connector, fastener, etc.) and a second connection member 139b (e.g., a connector, fastener, etc.) as illustrated in FIG. 10.

The first connection member 139a may be coupled to a fuselage skin-side member 130a, such that they each may constitute opposite sides of a portion of the front fuselage frame, and more specifically, may have a shape having a predetermined curvature to correspond to the fuselage skin-side member 130a.

In addition, the second connection member 139b horizontally extends from the first connection member 139a so as to be brought into contact with the upper surface of the second mounting member 1524, and has formed therein the through hole H so that the nut 138b fastened to the fastening member 138a is engaged therein.

More specifically, the through hole H includes a first through hole portion H1 and a second through hole portion H2, the first through hole portion H1 being configured to guide the nut 138b to be engaged and fixed therein and the second through hole portion H2 extending from and contiguous with the first through hole portion H1. Here, the second through hole portion H2 may be formed behind the first through hole portion H1 (e.g., in a longitudinal direction of the fuselage) and may have a larger diameter than the first through hole portion H1 (see FIG. 10).

Because the second through hole portion H2 has a larger diameter than that of the first through hole portion H1, i.e., because the second through hole portion H2 has a diameter larger than the diameter of the nut 138b to which the fastening member 138a is fastened, if the second mounting member 1524 including the nut 138b moves rearwards, the nut 138b is disengaged from the second through hole portion H2, and eventually the battery unit 1500 is selectively separated from the floor member 139.

If a crash load is generated at the crash unit 1200, the crash load is partially absorbed in the deformation section A and the support section B of the extension frame 1400 while passing therethrough and then transmitted to the battery support 1520, thereby allowing the battery support 1520 to be moved rearwards. Here, if the battery support 1520 is moved rearwards, the second mounting member 1524 is also moved rearwards, and the nut 138b including the fastening member 138a is forcibly moved in the direction of the arrow in FIG. 9 and is disengaged from the first through hole portion H1. The second mounting member 1524 is moved to the second through hole portion H2 and the binding force on the nut 138b is released. Accordingly, the battery support 1520, including the second mounting member 1522 having the nut 138b, is separated from the floor member 139 together with the battery 1510, and eventually is disengaged from the floor frame 130.

As a result, in this example, if a crash load is generated at the crash unit 1200, the crash load is partially absorbed in the extension frame 1400 while being transmitted to the battery unit 1500, and the crash load transmitted to the battery unit 1500 moves the battery unit 1500 rearwards so as to separate the battery unit 1500 from the floor frame 130, and as such, safety against fire caused by the battery 1510 may be effectively secured by preventing a problem in which a fire occurs in the battery 1510 if the fuselage 10 falls obliquely.

The present disclosure has been made in an effort to solve the above-described problems associated with the prior art, and it is an object of the present disclosure to provide a crash load distribution structure of a fuselage in which, when the fuselage falls obliquely, a frontal structure of the fuselage is deformed by a crash load and a battery assembly is moved rearwards by the deformation of the frontal structure so as to be separated from a floor frame, thereby securing safety against fire cause by a battery.

In one aspect, the present disclosure provides a structure including a front fuselage frame surrounding the front surface of the fuselage, a crash unit disposed at the front end of the front fuselage frame, an extension frame coupled to the crash unit and extending to a floor frame, and a battery unit disposed under the floor frame and coupled to a floor member constituting the floor frame, and being selectively separated from the floor member when a crash load is transmitted from the extension frame.

In an example, the extension frame may extend downwards towards the floor frame, and may include a deformation section where a crash load is absorbed and a support section bent from the deformation section in a width direction and configured to support the crash load.

In another example, the battery unit may include a battery configured to supply power to drive the fuselage, and battery supports each coupled to a corresponding one of opposite sides of the battery and connected to the end portion of the extension frame extending to the floor frame.

In still another example, the battery support may be movable rearwards by the crash load transmitted from the extension frame.

In yet another example, the battery support may include a first mounting member connected to the extension frame, and a second mounting member extending horizontally from the first mounting member and coupled to the floor member using a fastening member and a nut passing together through the floor member.

In still yet another example, the floor member may include a first connection member coupled to a fuselage skin-side member defining opposite sides of the front fuselage frame, and a second connection member horizontally extending from the first connection member so as to be brought into contact with an upper surface of the second mounting member, and having formed therein a through hole in which the nut is engaged.

In a further example, the through hole may include a first through hole configured to fix the nut in place and a second through hole extending from the first through hole, and the second through hole may be formed behind the first through hole and have a larger diameter than that of the first through hole.

In another aspect, the present disclosure provides a structure including a front fuselage frame surrounding the front surface of the fuselage, a crash unit disposed at the front end of the front fuselage frame, an extension frame coupled to the crash unit and extending to a floor frame, and including a deformation section where a crash load is absorbed and a support section bent from the deformation section in a width direction and configured to support the crash load, and a battery unit disposed under the floor frame and coupled to a floor member constituting the floor frame, and being selectively separated from the floor member when the crash load is transmitted from the extension frame.

In an example, the battery unit may include a battery configured to supply power to drive the fuselage, and battery supports each coupled to a corresponding one of opposite sides of the battery and connected to the end portion of the extension frame extending to the floor frame.

In another example, the battery support may be movable rearwards by the crash load transmitted from the extension frame.

It is to be understood that the term "vehicle" or "vehicular" or other similar terms as used herein are inclusive of motor vehicles in general, such as passenger automobiles including sport utility vehicles (SUV), buses, trucks, various commercial vehicles, watercraft including a variety of boats and ships, aircraft, and the like, and include hybrid vehicles, electric vehicles, plug-in hybrid electric vehicles, hydrogen-powered vehicles, and other alternative fuel vehicles (e.g. fuels derived from resources other than petroleum). As referred to herein, a hybrid vehicle is a vehicle that has two or more sources of power, for example, a vehicle powered by both gasoline and electricity.

As is apparent from the above description, the present disclosure provides the following effects.

In the present disclosure, if the fuselage falls obliquely, the frontal structure of the fuselage is deformed by the crash load and the battery assembly is moved rearwards by the deformation of the frontal structure so as to be separated from the floor frame, thereby securing safety against fire cause by the battery.

In addition, according to the present disclosure, if the fuselage falls obliquely, transmission of crash load to the space where passengers are located may be reduced, thereby securing passenger safety.

Moreover, according to the present disclosure, a support unit is adopted to transmit a crash load entering the fuselage to the wing unit and to the rear of the fuselage, thereby supporting the crash load transmitted to the space where passengers are located and minimizing deformation of the fuselage.

In the above, examples of the present disclosure have been described with reference to the accompanying drawings. However, those skilled in the art to which the present disclosure pertains will understand that various modifications may be made therefrom, and that all or part of the above-described example(s) may be selectively combined. Therefore, the true technical protection scope of the present disclosure should be determined by the technical ideas of the appended claims.

What is claimed is:

1. A structure, comprising:
   a front fuselage frame surrounding a front surface of a fuselage;
   a crash unit disposed at a front end of the front fuselage frame;
   an extension frame coupled to the crash unit and extending to a floor frame; and
   a battery unit disposed under the floor frame and coupled to a portion of the floor frame, wherein the battery unit is configured to be selectively separated from the portion of the floor frame based on a load transmitted via the extension frame to the crash unit.

2. The structure according to claim 1, wherein the extension frame extends towards the floor frame, and comprises:
   a deformation section configured to absorb the load, and
   a support section bent from the deformation section in a width direction of the fuselage and configured to receive the load.

3. The structure according to claim 1, wherein the battery unit comprises:
   a battery configured to supply power to drive the fuselage; and
   at least one battery support coupled to a side of the battery and connected to an end portion of the extension frame extending towards the floor frame.

4. The structure according to claim 3, wherein the at least one battery support is movable rearwards by the load transmitted via the extension frame.

5. The structure according to claim 3, wherein the at least one battery support comprises:
   a first mounting member connected to the extension frame; and
   a second mounting member extending horizontally from the first mounting member and coupled to the portion of the floor frame using a fastening member and a nut passing together through the portion of the floor frame.

6. The structure according to claim 5, wherein the portion of the floor frame comprises:
   a first connector coupled to a fuselage skin-side portion of the front fuselage frame, wherein the first connector and the fuselage skin-side portion constitute opposite sides of the front fuselage frame; and
   a second connector horizontally extending from the first connector in contact an upper surface of the second mounting member, wherein the second connector has a through hole configured to engage the nut.

7. The structure according to claim 6, wherein:
   the through hole comprises a first through hole portion configured to fix the nut in place and a second through hole portion extending from the first through hole portion, and
   the second through hole portion is formed behind the first through hole portion and has a larger diameter than that of the first through hole portion.

8. A structure, comprising:
   a front fuselage frame surrounding a front surface of a fuselage;
   a crash unit disposed at a front end of the front fuselage frame;
   an extension frame coupled to the crash unit and extending to a floor frame, and including:
   a deformation section configured to absorb a load, and a support section bent from the deformation section in a width direction of the fuselage and configured to receive the load; and a battery unit disposed under the floor frame and coupled to a portion of the floor frame, and configured to be selectively separated from the portion of the floor frame based on the load being transmitted via the extension frame.

9. The structure according to claim 8, wherein the battery unit comprises:

a battery configured to supply power to drive a vehicle comprising the fuselage; and at least one battery support coupled to a side of the battery and connected to an end portion of the extension frame extending towards the floor frame.

10. The structure according to claim 9, wherein the at least one battery support is movable rearwards by the load transmitted via the extension frame.

\* \* \* \* \*